No. 781,045. PATENTED JAN. 31, 1905.
B. F. BROOKE-SEWELL.
APPARATUS FOR EVAPORATING AND DISTILLING LIQUIDS.
APPLICATION FILED FEB. 5, 1903.
3 SHEETS—SHEET 1.
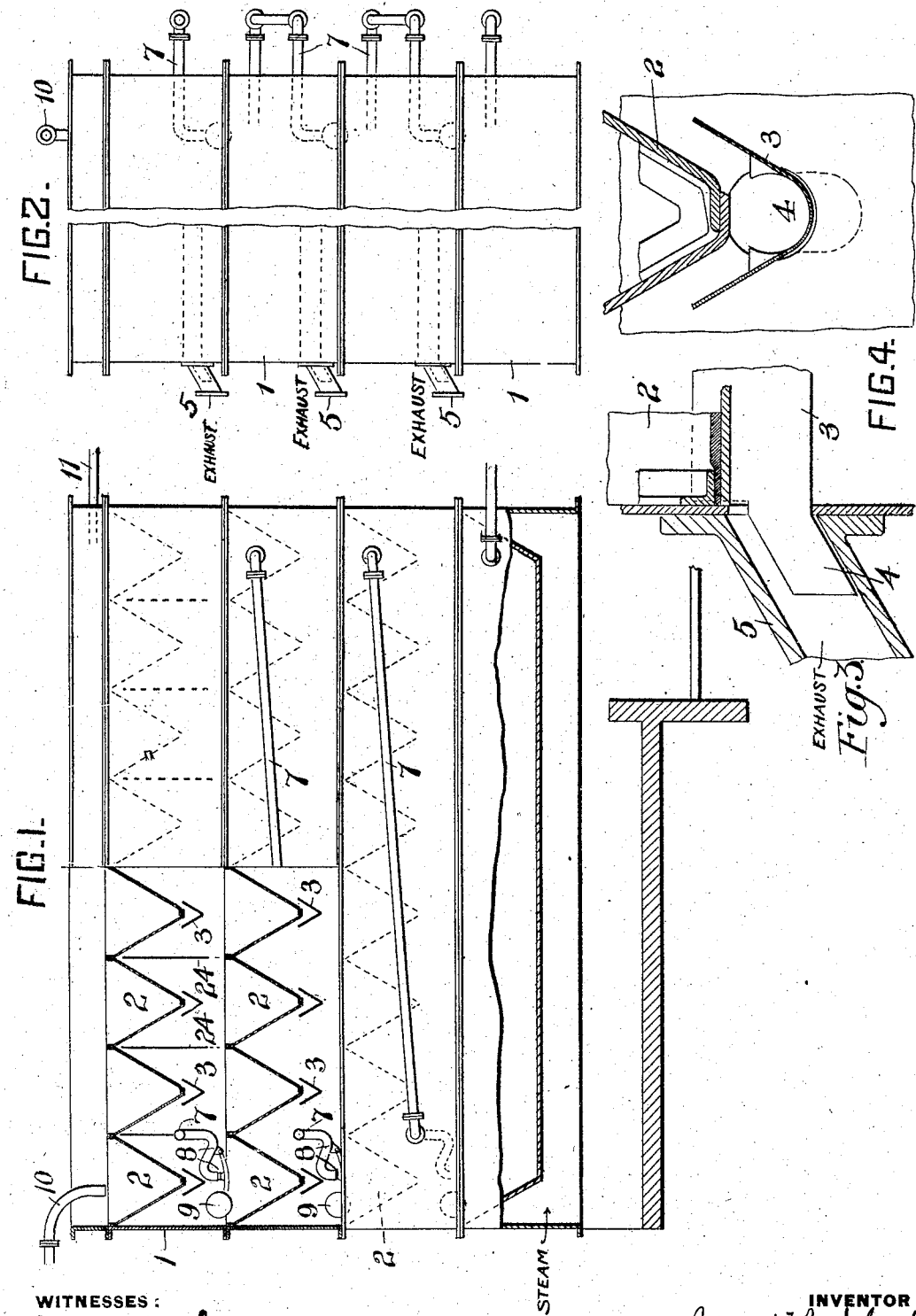
WITNESSES:
Fred Kirchner
Herbert Bradley
INVENTOR
Benjamin F. Brooke-Sewell
by Daniel S. Wolcott Att'y.

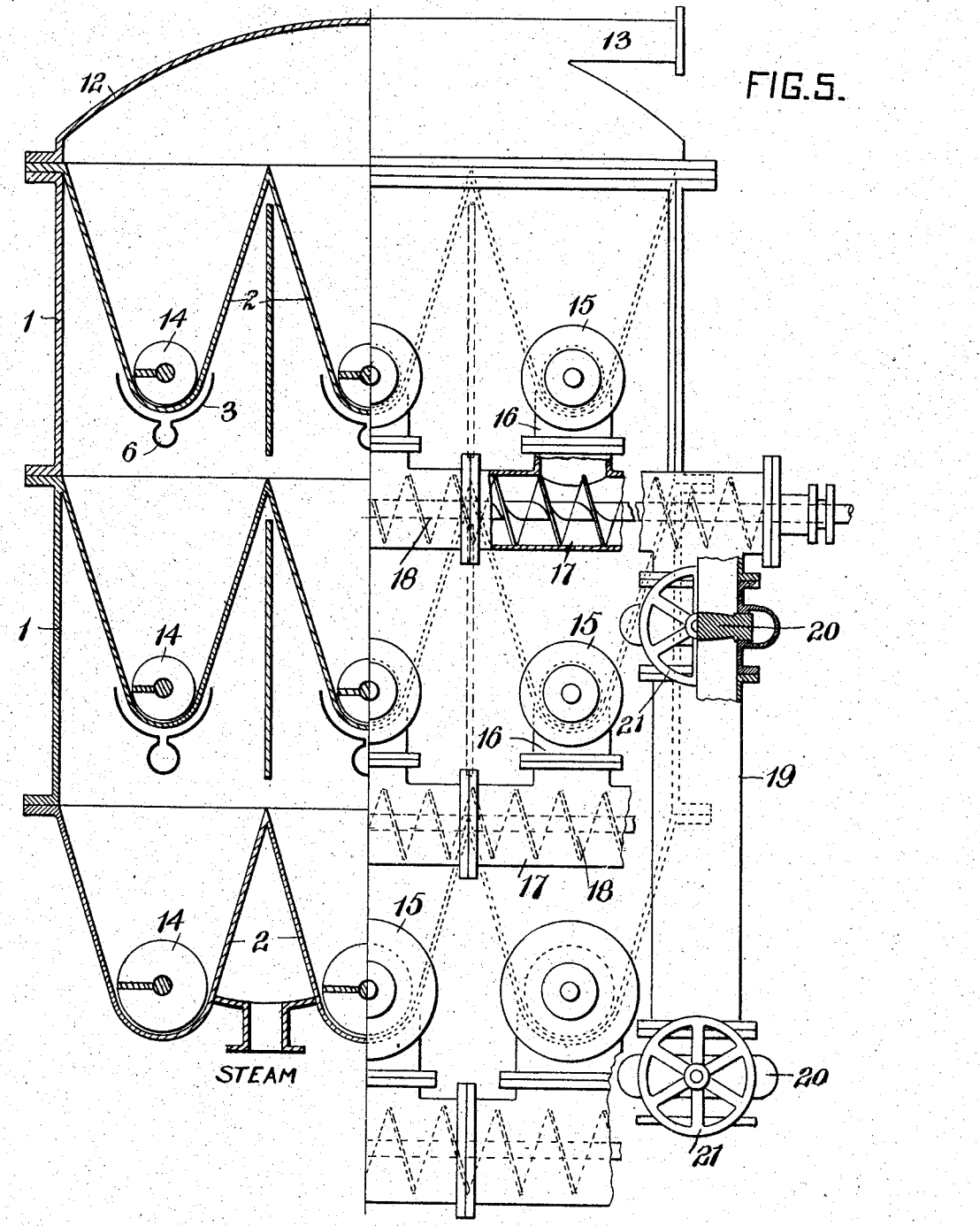

No. 781,045. PATENTED JAN. 31, 1905.
B. F. BROOKE-SEWELL.
APPARATUS FOR EVAPORATING AND DISTILLING LIQUIDS.
APPLICATION FILED FEB. 5, 1903.

3 SHEETS—SHEET 3.

WITNESSES:
Fred Kirchner.
Herbert Bradley.

INVENTOR
Benjamin F. Brooke Sewell
by Darwin S. Wolcott Att'y.

No. 781,045. Patented January 31, 1905.

UNITED STATES PATENT OFFICE.

BENJAMIN F. BROOKE-SEWELL, OF SKIEN, NORWAY.

APPARATUS FOR EVAPORATING AND DISTILLING LIQUIDS.

SPECIFICATION forming part of Letters Patent No. 781,045, dated January 31, 1905.

Application filed February 5, 1903. Serial No. 141,976.

*To all whom it may concern:*

Be it known that I, BENJAMIN F. BROOKE-SEWELL, a subject of the King of Great Britain, residing at Skien, Bratsberg Amt, Norway, have invented or discovered certain new and useful Improvements in Apparatus for Evaporating and Distilling Liquids, of which improvements the following is a specification.

The invention described herein relates to certain improvements in apparatus for evaporating or distilling liquids, and has for its object a construction whereby the latent heat developed by the condensation of vapor generated in one receptacle or chamber is utilized for heating the liquid in an adjacent chamber or receptacle and is then drawn off or removed from the chamber.

It is a further object of the invention to provide for the transfer of the liquid during concentration from one chamber or receptacle to another, so as to permit of the removal of different distillates as desired, and, further, the invention has for its object suitable provision for the removal of solid matters through a suitable seal, thereby preventing any reduction of vacuum in a receptacle or chamber where evaporation is being effected.

The invention is hereinafter more fully described and claimed.

Figure 6:
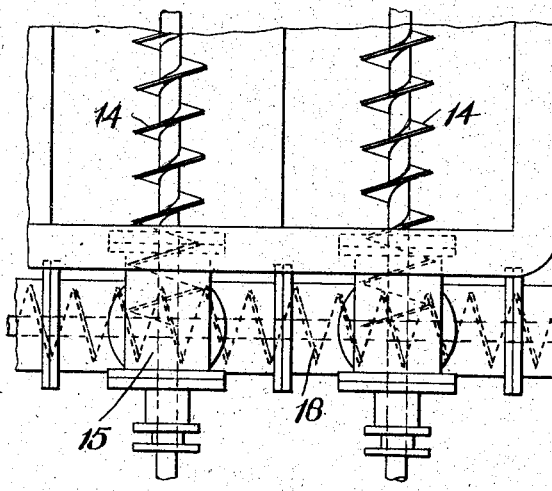
Figure 7:
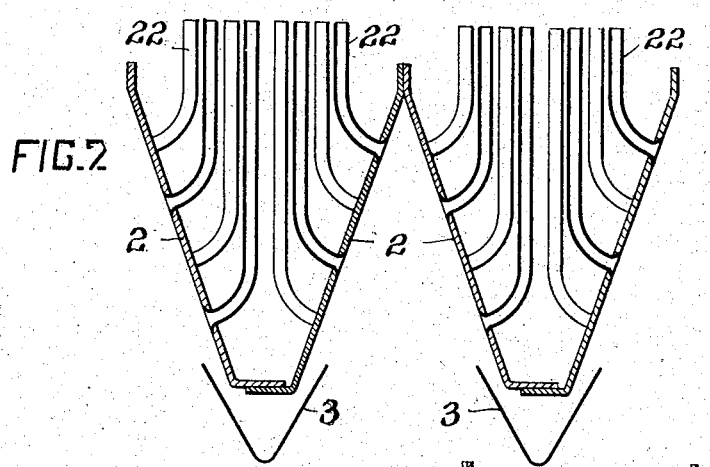
Figure 8:
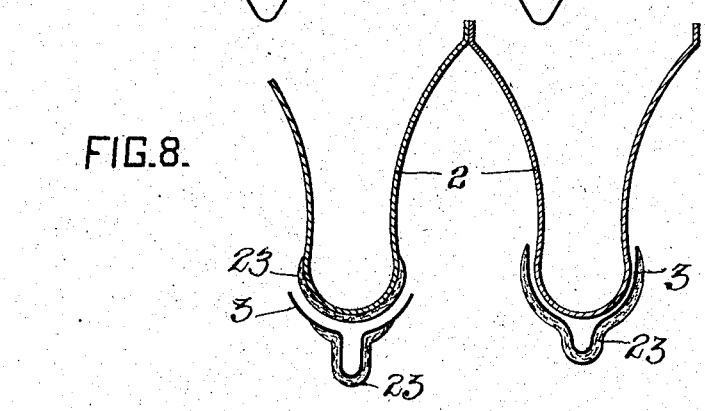

In the accompanying drawings, forming a part of this specification, Figure 1 is a view, partly in elevation and partly in section, illustrative of my improved apparatus. Fig. 2 is an end elevation of the same. Figs. 3 and 4 are sectional detail views showing the means for collecting the condensed vapors and conducting them from the receptacles. Fig. 5 is a view, partly in elevation and partly in section, illustrating a modification of the apparatus and showing a means for removing solid matters from the evaporating-chambers. Fig. 6 is a plan view of a portion of the apparatus shown in Fig. 5, and Figs. 7 and 8 are sectional views illustrating certain modifications in parts of the apparatus.

In the practice of my invention I employ two, three, or more receptacles arranged in such relation to each other that the vapor generated in one receptacle or chamber can impinge upon surfaces of another chamber or receptacle and on condensation against such surfaces flow down to a suitable receiver or channel and be conducted outside of the chamber in which the vapors are generated. A desirable construction for this purpose is shown in Fig. 1, where I employ a series of two or more shells 1, arranged one upon the other, as shown. Within these shells I arrange partitions or diaphragms so constructed as to form a series of pockets or recesses 2, having inclined sides terminating in an edge or point—as, for example, in the construction shown in Fig. 1 the pockets are made V-shaped and extend transversely across the shell. As shown in Fig. 1, these pockets or recesses 2 may be arranged in such manner that the lower apex of a pocket in one shell or cylinder shall be in or approximately in a plane passing the median line of the next adjacent pocket or recess above or below, so that the vapor arising from one of the pockets will impinge against the inclined sides of a pocket immediately above. On striking these surfaces the vapor will be condensed, and the latent heat thus developed will heat the liquid contained in the pocket, whose sides form the condensing-surfaces. As the vapors condense the liquid will flow down along the sides of the pocket into a receiver or channel 3, arranged in proper relation to the lower apex or edge of the pocket 2. This receiver or channel 3 is given a slight inclination toward one side of the shell and is provided at its lower end with an extension passing through the wall of the shell and is connected outside of such shell with a suitable exhaust apparatus, so as to maintain any desired vacuum within the shell. As shown in Figs. 1, 3, and 4, the channel may be made V-shaped and provided with a lip 4, passing through an opening in the shell and extending into a tube 5, which is adapted to be connected to an exhaust apparatus. As shown in Fig. 5, the channel may be formed by a tubular portion 6, longitudinally slotted, and wings extending from the edges of the slot. The slot in the tubular portion is in line with apices of the pockets, and the wings extend up parallel with the sides of the pockets. One end of each of the tubular portions is unslotted and extends through one side of the shell, forming a tight joint therewith.

In operating my improved apparatus the grade of liquid under treatment requiring the lowest temperature for evaporation is charged into the uppermost receptacle and that requiring the highest temperature into the lowest receptacle. The liquid in the lowest receptacle can be heated by any suitable furnace, as shown in Fig. 1, or by steam, as shown in Fig. 5, and the bottom of such lower receptacle need not be corrugated or formed with pockets, but may have a plain flat bottom. Provision may be made for conducting the liquid as concentration progresses from one series of receptacles to another by means of a pipe 7, extending from the last recess or pocket of one receptacle to the first recess or pocket of the next lower receptacle, as clearly shown in Fig. 1. While not necessary, it is preferred to regulate the flow of liquid from one series to the other by means of a valve, as indicated at 8, arranged in the pipe 7 and controlled by a float 9, thereby preventing the liquid in any one receptacle rising above the desired level.

As shown in Fig. 1, the top or cover of the apparatus may be constructed similar to the bottoms or partitions of each of the receptacles, and the inclined surfaces so formed may be cooled, so as to condense the liquid in the first or uppermost receptacle, by water flowing onto the surfaces from the pipe 10 and escaping by the pipe 11, or, and as generally preferred, a closed hermetic cap or cover 12, Fig. 5, may be employed for the topmost receptacle, such cover being provided with a gooseneck 13, adapted to be connected to a condenser or to a vacuum-producing apparatus.

In order to remove solids resulting from the evaporation of liquids—such as salt water, oil, or any liquid which when evaporated will leave a solid or semisolid residuum—suitable means operating along the sides and bottoms of the pockets may be employed—as, for example, in Figs. 5 and 6 a screw 14 is arranged in each of the pockets 2, the shaft thereof extending out through a suitable stuffing-box, so as to permit of the rotation of the screw. The screws extend into tubes or sleeves 15, extending from the sides of the shell and connected by necks 16 to transverse tubes 17, in which are arranged screws 18, adapted to shift the solids delivered into the tubes 17 to one end thereof, whence they drop into a chamber 19. This chamber is provided at its upper and lower ends with sluice-valves 20, adapted to be operated by hand-wheels 21. In the use of the apparatus the lower valve is closed and the upper valve opened until the chamber is charged, when the valves are reversed and the material removed from the chamber. By this construction a vacuum can be maintained in the vaporizing-chambers at approximately the same point while removing the solids produced.

As shown in Fig. 7, the combined heating and condensing surfaces of each of the pockets can be increased by means of a series of tubes 22, having their upper ends closed, while their lower ends are expanded into the sides of the pockets through which they extend. In order to prevent a revaporization by the heat of the rising vapors, the troughs or channels 3 may have their exposed surfaces covered with non-conducting material 23, as shown in Fig. 8, and the lower portions of the pockets may be similarly protected to prevent such boiling of the liquid as will interfere with the regular crystallizing of the salt or other solids, and, further, if desired, the sides of the pockets may be made curved, as shown.

Where the series of pockets of one receptacle are connected to those of the next receptacle, as shown in Fig. 1, a height of liquid may be maintained in each receptacle sufficient only to cover the walls between adjacent pockets, so that there will be a small flow from one pocket to the next and from the last pocket of one series to the first pocket of the next series. By thus operating the apparatus the liquid in each pocket commencing with the first one of the series will be at a different temperature from that in the next and there will be maintained a series of fractional distillations—that is to say, the distillate given off from one pocket, will be slightly different from that given off by the next—and as the distillate from each pocket condenses on the surfaces immediately above it and is collected by the channel underneath such condensing-surfaces a very fine fractional distillation can be effected. A more distinct separation of the distillates can be produced by arranging partitions 24 immediately in line with the divided walls of the pockets, as shown in Figs. 1 and 5. This partition should not extend down sufficiently far to prevent the flow of liquid from one pocket to the next. By the employment of such partitions the vapor arising from the pocket or pockets between two adjoining partitions is isolated from the vapors arising from any other of the pockets.

It will be understood that except where fractional distillation is being effected all the channels 3 can be connected to a common connection leading to the vacuum - producing mechanism. When the apparatus is being used for fractional distillation, the channels are connected singly or in groups to vacuum-producing mechanism, according to the degree to which the fractional distillation is to be carried.

As shown in Fig. 1, the pockets may be formed of sheet metal and secured together and to the inclosing case or shell by rivets or any other suitable means, or the pockets and shell may be cast integral with each other, as shown in Fig. 5, or cast separate and the pockets provided with flanges resting upon the upper ends of the shell, as also shown in Fig. 5.

It will be readily understood by those skilled in the art that in treating some liquids a vacuum need not be maintained in each of the receptacles, although in most cases the employment of a vacuum is desirable. Hence each of the receptacles need not be entirely closed.

It is characteristic of my improvement that each of the receptacles in which evaporation is effected is arranged closely adjacent to the other and that therefore for a given capacity my improved apparatus will occupy much less room than the forms of apparatus now in use for producing multiple effects, in which the different parts or members of the apparatus are arranged side by side or else one above the other on independent floors of the building.

I claim herein as my invention—

1. In an apparatus for evaporating liquids, the combination of two or more chambers or receptacles, means arranged in one chamber or receptacle for condensing the vapors generated therein and for transmitting heat developed during condensation to the liquid contained in the other chamber, means for collecting and carrying away the liquid formed by condensation, and means for removing solid matter deposited in the chambers or receptacles, substantially as set forth.

2. In an apparatus for evaporating liquids, the combination of a chamber or receptacle having its bottom formed by a series of pockets, means for isolating the vapors arising from the liquid contained in one or more pockets from those arising from the liquids contained in the other pockets, means arranged in the chamber or receptacle for condensing the vapors and for collecting and carrying away the isolated and condensed vapors, substantially as set forth.

3. In an apparatus for evaporating liquids, the combination of a chamber or receptacle, condensing-surfaces arranged in said chamber, said surfaces being inclined and converging to form depending edges or apices, means arranged below the apices or edges for collecting and carrying away the liquid formed by condensation, and means for removing solid matter deposited on the inclined surfaces, substantially as set forth.

4. In an apparatus for evaporating liquids the combination of two or more receptacles arranged one above the other and having bottoms formed of a series of pockets having inclined sides, collecting-channels arranged below the junction of the sides of the pockets, an exhaust mechanism, connections extending from the channels outside of the chambers or receptacles and connected to the exhaust mechanism, substantially as set forth.

5. In an apparatus for evaporating liquids the combination of a receptacle or chamber having its bottom formed by a series of pockets, means arranged above said pockets for condensing the vapors arising therefrom, channels arranged to receive the condensed vapors, an exhaust mechanism connected to said channels whereby a vacuum is maintained within the chamber or receptacle and means for removing solid matter from the pockets without breaking the vacuum formed in the chambers, substantially as set forth.

6. In an apparatus for evaporating liquids, the combination of two or more chambers or receptacles having their bottoms formed by a series of pockets, means for conducting the liquid from one chamber to another, means for isolating the vapors arising from the liquid contained in one or more of the pockets, means arranged in each chamber or receptacle for condensing the vapors formed therein, and means for collecting and carrying away the isolated and condensed vapors, substantially as set forth.

7. In an apparatus for evaporating liquids, the combination of a chamber or receptacle having its bottom formed of a series of pockets, means arranged above said pockets for condensing the vapors arising from liquids contained in said pockets, partitions arranged in said chamber to prevent the vapor arising from one or more of the pockets mixing with the vapors from the other pockets, and means for collecting and carrying away the separated and condensed vapors, substantially as set forth.

In testimony whereof I have hereunto set my hand.

BENJAMIN F. BROOKE-SEWELL.

Witnesses:
F. E. GAITHER,
H. M. CORWIN.